No. 769,166. PATENTED SEPT. 6, 1904.
G. H. JAQUITH.
CAN OPENER.
APPLICATION FILED JAN. 23, 1904.
NO MODEL. 2 SHEETS—SHEET 2.

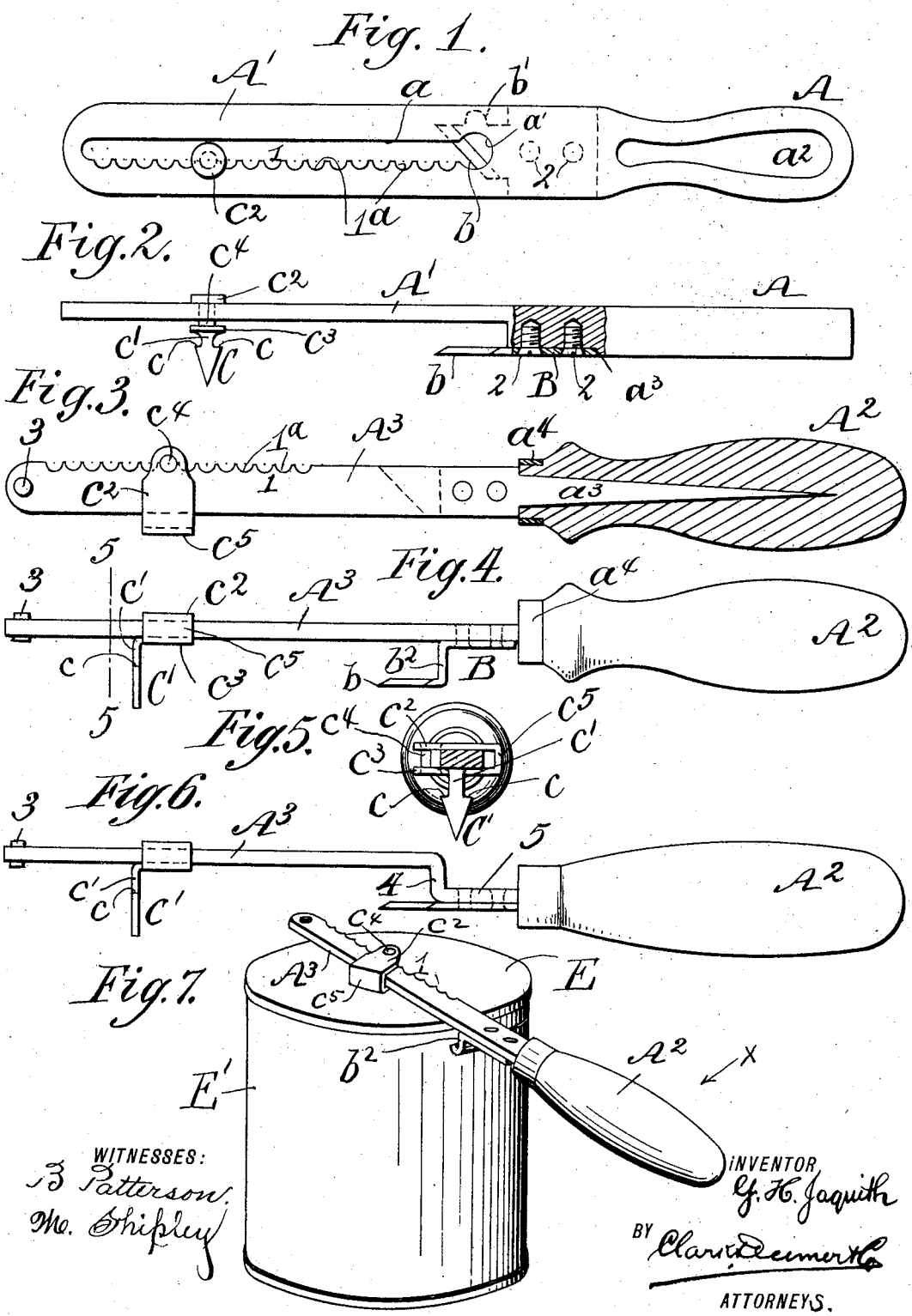

WITNESSES:
B. Patterson
Wo. Shipley

INVENTOR
G. H. Jaquith
BY
Clark Raymer & Co.
ATTORNEYS.

No. 769,166. Patented September 6, 1904.

UNITED STATES PATENT OFFICE.

GEORGE HORACE JAQUITH, OF CHICAGO, ILLINOIS.

CAN-OPENER.

SPECIFICATION forming part of Letters Patent No. 769,166, dated September 6, 1904.

Application filed January 23, 1904. Serial No. 190,276. (No model.)

*To all whom it may concern:*

Be it known that I, GEORGE HORACE JAQUITH, a citizen of the United States, and a resident of Chicago, county of Cook, and State of Illinois, have invented certain new and useful Improvements in Can-Openers, of which the following is a specification, reference being had to the accompanying drawings, forming a part thereof, in which similar characters of reference indicate corresponding parts.

This invention relates to can-openers, the object thereof being to provide an efficient device of this character adapted for effectively and quickly opening or cutting away parts of metallic cans, whereby the contents may be readily removed.

The device is simple in construction, durable and inexpensive, and adaptable for successful use in connection with all varieties of cans.

The device comprises a rod having a rack and an end stop, a slide movable on said rod and embodying a vertical spur, a rigidly-fixed horizontal knife, and means carrying said parts, the spur adjustable to and from the knife for the accommodation of cans of different diameters.

The invention will be hereinafter fully described, and specifically set forth in the annexed claims.

Figure 8:
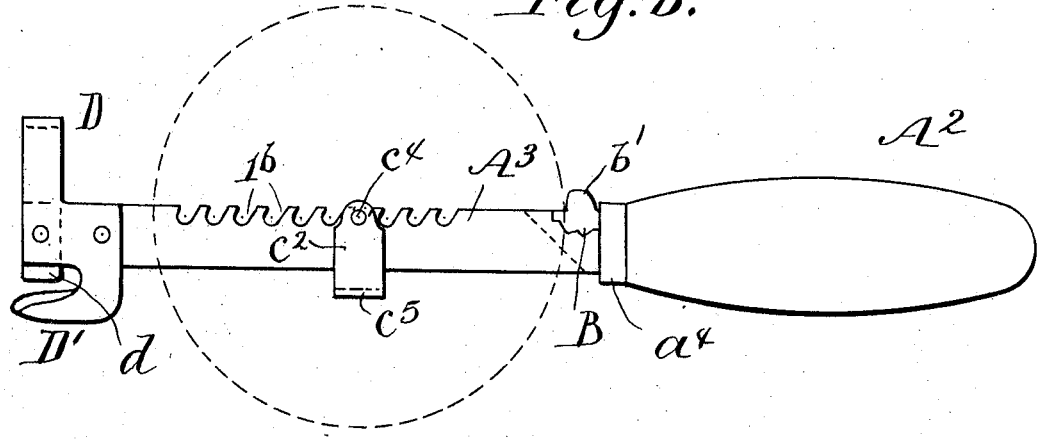
Figure 9:
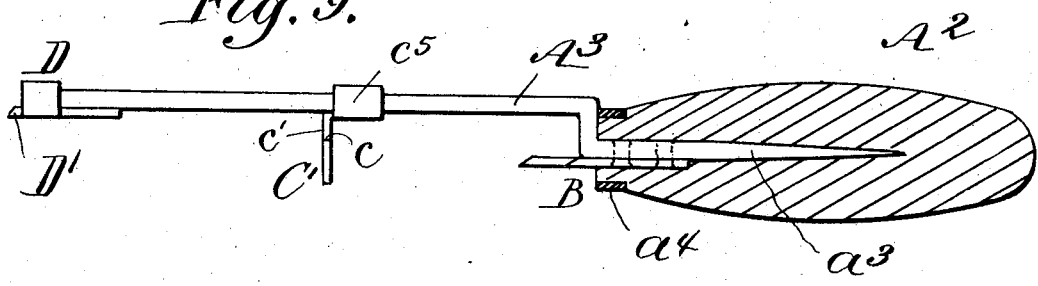
Figure 10:
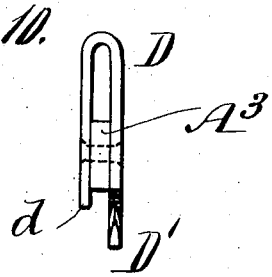

In the accompanying drawings, forming part of this specification, Figure 1 is a plan view illustrating one form of my invention. Fig. 2 is a side elevation thereof, shown partly in sectional elevation. Fig. 3 is a plan view, partly in sectional elevation, of another form of the device. Fig. 4 is a side elevation thereof. Fig. 5 is a cross-sectional elevation taken on the line 5 5 of Fig. 4. Fig. 6 is a side elevation illustrating a slightly-modified example of the device, and Fig. 7 is a perspective view illustrating the mode of operating the invention. Fig. 8 is a plan view of a further modification. Fig. 9 is a side view thereof, and Fig. 10 is an end view of Fig. 8.

In the practice of my invention in each form of the device I provide, primarily, a handle and an elongated rod with a rack formed integral therewith. In the example illustrated by Figs. 1 and 2 of the drawings the handle A and rod A' are formed integral from cast or wrought metal, as iron, and the rack 1 is formed on one horizontal edge of a centrally-located longitudinal slot $a$ in the rod A', which has an enlarged circular opening $a'$ contiguous to the handle part A. In each of the other arrangements shown by the drawings the rack is formed on one edge of the rod carrying the slide, and this said rack may be formed by semicircular recesses, as $1^a$, or said recesses may be extended at an angle, as shown by $1^b$, Fig. 8 of the drawings. This latter form of rack obviates all liability of accidental disengagement of the slide and rack during the operation of using the device. The handle part A, as shown by Figs. 1 and 2 of the drawings, is considerably thicker than the rod A', and it is provided with an elongated opening $a^2$, which not only lightens the structure and saves metal, but also provides looped means for hanging the device to a nail or other extension. On the under surface of the end of the handle part contiguous to the rod A' is formed a recess $a^3$ for receiving a normally fixed but preferably removable knife B, which is composed of tempered steel and has a cutting edge $b$ of angular contour and extended beyond the handle A and a laterally-extended lug $b'$ to limit the inward movement of the knife into the can-body when the device is in use. The said knife is extended parallel with the bar A' and below the same. This knife is securely held in place by means of screws 2, whereby it may be removed for purposes of sharpening or renewal, if desired; but I may employ rivets as a fastening means. Slidably engaging the rack 1 is a slide embodying a spur C, approximately of arrow-head contour, having laterally-extended shoulders $c$ and a shank $c'$. This spur forms an integral part of upper and lower plates $c^2$ $c^3$ and a pin $c^4$, which engages the rack 1. The plates $c^2$ $c^3$ are of a size sufficiently large in area to prevent removal of the spur C from the slot $a$ when all parts of the device are assembled; but it can be readily connected and disconnected through the medium of the opening $a'$ when the knife B is removed or before said knife is placed when same is held by rivets.

In the example of the invention illustrated by the remaining figures of the drawings the handle $A^2$ and rod $A^3$ are formed separately and connected by means of the tapered extension $a^3$ of the rod $A^3$ and a ferrule $a^4$. In this arrangement of the device the slide embodies the spur $C'$, having the shoulders $c$ and shank $c'$ and upper and lower plates $c^2 c^3$; but said plates are elongated and connected by an integral end wall $c^5$, arranged opposite the pin $c^4$, whereby the slide may be moved transversely relative to the rack for purposes of adjustment, while at the same time it is non-removable, because of a stop 3, located at the free end of the rod $A^3$.

In lieu of the stop 3 I may employ a metallic loop D, which is riveted to the end of the rod $A^3$ and has an integrally-formed knife $D'$, which may be employed for cutting away the lids of cans of rectangular or square contour, the end $d$ adapted for engagement around the edge of the can. This example of the device is illustrated by Figs. 8, 9, and 10 of the drawings, and in this structure the knife end is embedded in the handle to provide a very strong and operable device.

In the structure illustrated by Figs. 4 and 7 of the drawings the rod $A^3$ is flat throughout its entire length, and the knife B, which is connected thereto by means of the screws or rivets, as 2, has a vertical bend $b^2$, connecting its two horizontal parts, whereby the cutting edge $b$ is located below the rod $A^3$, so that a cut may be made peripherally around the can below the top thereof.

In the example illustrated by Figs. 6 and 9 the rod itself has a vertical bend 4 and a horizontal offset 5 extended therefrom for engagement with the knife to maintain the same in proper relative position.

In the operation of the invention the spur C is driven through the center of the can-top E, with its lower plate resting on said can-top. Then through the medium of the handle the knife is driven into the side of the can, and force then exerted against the handle in the direction of the arrow $x$, Fig. 7 of the drawings, carries the rack into engagement with the pin $c^4$ and maintains such engagement until an annular cut or incision is made in the can-body $E'$, the shank $c'$ of the spur acting as a fulcrum and the shoulders $c$ preventing removal of the spur until an entire revolution has been made, whereupon said spur can be readily removed through the elongated incision made thereby in the first instance.

The fixed arrangement of the knife and the transversely and horizontally movable spur renders this device not only readily and automatically adjustable to different sizes of cans, but provides practically fixed relative arrangement of the said spur and knife during the operation of cutting the incision around the can, which greatly facilitates the process of cutting and produces a smooth edge on the cut part of the body of the can, whereby contents of any character may be readily removed.

Having now described my invention, what I claim as new, and desire to secure by Letters Patent, is—

1. A can-opener comprising a handle, a rod having a rack thereon, a fixed knife having an angular cutting edge and arranged parallel with said rod beneath the same, and a slide on said rod and embodying upper and lower plates, a pin for engaging the rack of the rod, a spur of flattened arrow-head contour and having lateral shoulders and a shank, whereby said spur may be driven into a can-top and retained therein during the operation of cutting an annular incision, substantially as shown and described.

2. In a can-opener, the combination, with the handle and rod having the rack thereon, and the fixed knife having the angular edge, of the slide longitudinally and transversely movable on said rod and having the pin for engaging the rack, upper and lower plates and spur embodying the arrow-head formation and shank, substantially as shown and described.

3. In a can-opener, the combination with the handle and rod having a rack, and an end stop, and the fixed knife having the angular cutting edge and lug for engagement with the side wall of the can, of the slide longitudinally and transversely movable on said rod and having the pin for engaging the rack, substantially as shown and described.

4. A can-opener comprising a handle, a rod having a rack embodying angularly-extended recesses, and an end stop, a knife having an angular cutting edge and arranged parallel with and below said rod, a slide longitudinally and transversely movable on said rod and having a pin for engaging the rack and a spur of arrow-head contour, substantially as shown and described.

In testimony that I claim the foregoing as my invention I have signed my name, in presence of two witnesses, this 22d day of December, A. D. 1903.

GEORGE HORACE JAQUITH.

Witnesses:
HOSEA W. WELLS,
CHARLES C. STILWELL.